US006912000B1

(12) United States Patent  (10) Patent No.: US 6,912,000 B1
Shigeta  (45) Date of Patent: Jun. 28, 2005

(54) PICTURE PROCESSING APPARATUS (75) Inventor: Kazuyuki Shigeta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,373

(22) Filed: Feb. 23, 2000

(30) Foreign Application Priority Data

Feb. 26, 1999 (JP) .......................................... 11/051647

(51) Int. Cl.[7] .......................... H04N 5/228; H04N 9/64; G09G 5/39; G06F 13/372
(52) U.S. Cl. .................... 348/222.1; 348/715; 348/721; 348/718; 345/534; 345/532
(58) Field of Search ............................. 348/222.1, 312, 348/721, 715, 718, 333.01, 231.99; 345/532, 533, 534, 535; 710/52, 53

(56) References Cited

U.S. PATENT DOCUMENTS

| 5,103,311 | A | * | 4/1992 | Sluijter et al. | 348/571 |
| 5,467,465 | A | * | 11/1995 | Chen | 713/375 |
| 5,742,406 | A | * | 4/1998 | Suzuki | 345/502 |
| 5,850,268 | A | * | 12/1998 | Ohki et al. | 348/721 |
| 6,038,584 | A | * | 3/2000 | Balmer | 709/248 |
| 6,070,003 | A | * | 5/2000 | Gove et al. | 710/317 |
| 6,188,381 | B1 | * | 2/2001 | van der Wal et al. | 348/721 |
| 6,657,640 | B2 | * | 12/2003 | Shigeta | 345/690 |
| 6,657,674 | B1 | * | 12/2003 | Asada et al. | 348/222.1 |
| 6,738,356 | B1 | * | 5/2004 | Russell et al. | 709/204 |
| 6,791,555 | B1 | * | 9/2004 | Radke et al. | 345/532 |

FOREIGN PATENT DOCUMENTS

JP 02040688 A * 2/1990 ............ G09G/5/14

* cited by examiner

Primary Examiner—Wendy R. Garber
Assistant Examiner—John M. Villecco
(74) Attorney, Agent, or Firm—Fitzpatrick, Cella, Harper & Scinto (57) ABSTRACT A picture processing apparatus is composed of a plurality of picture processing systems. Each picture processing system includes an identical picture processing IC (integrated circuit) and a plurality of memories each capable of memorizing a picture frame and including at least two memories operating at different timings. The picture processing IC includes a picture processing unit, an operation timing signal generator, a plurality of control timing signal generators for controlling different memories, and a memory control signal selection circuit for selectively outputting one of at least two memory control timing signals. As a result, the number of output pins of each picture processing IC for outputting memory control signal can be reduced, whereby the picture processing apparatus can be produced at a lower cost while retaining an identically large size of the picture processing ICs.

6 Claims, 11 Drawing Sheets

PICTURE PROCESSING APPARATUS

FIELD OF THE INVENTION AND RELATED ART

The present invention relates to a picture processing apparatus for use in a picture processing unit of a picture display apparatus, and image sensors, such as a digital camera and a video camera, and particularly a picture processing apparatus including a plurality of picture processing systems for respective colors of, e.g., R, G and B.

Along with development of high resolution displays and high resolution image sensors, such as a digital camera and a video camera in recent years, the picture processing unit requires an increased memory capacity for processing. For example, in the case of processing an 8-bit gradation picture at a resolution of XGA (1024×768 pixels), it is required to process 6.3 M bits/(picture) frame for each color of R, G and B. This corresponds to a processing speed of 378 M bits/sec for each color in the case of a motion picture of 60 Hz.

If such picture processing is performed at real time by using a single memory for one picture frame by repetition of writing and readout, a high picture processing speed is required, and a large load is placed on a hardware.

Accordingly, in some cases, another memory for one picture frame is provided, and two or more memories are exchanged for each prescribed period to perform writing and readout alternatively, thereby reducing the picture processing speed for each memory.

Further, along with progress of higher functionality and higher picture quality of image sensors and display devices, a plurality of such functions requiring more than one frame memory may be present in some cases.

In this way, in a current picture processing apparatus, there is an increasing demand for separately controlling two or more frame memories.

Figure 2:
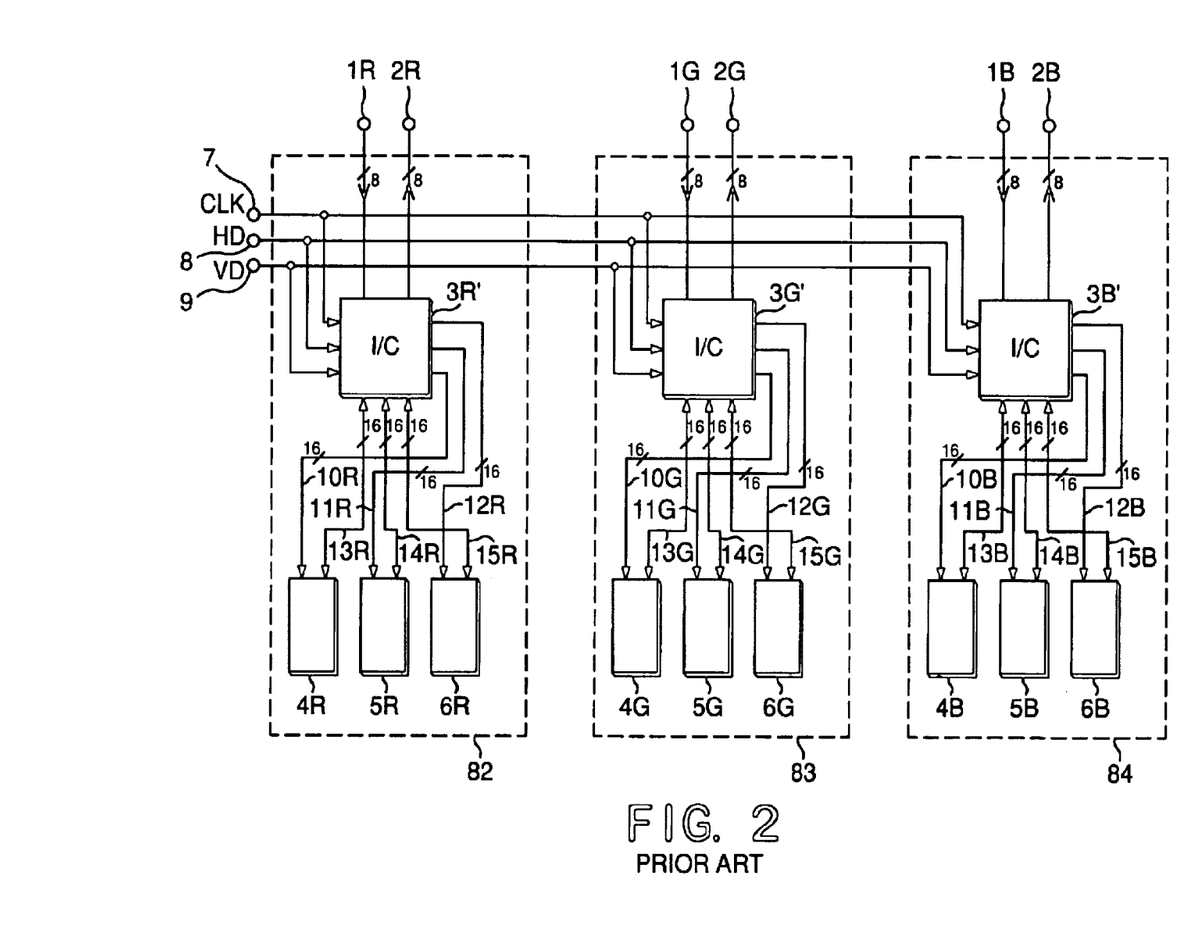
FIG. 2 is a block diagram of a conventional picture processing apparatus.

FIG. 2 is a block diagram of a known example of such a picture processing unit. In FIG. 2, blocks 82, 83 and 84 represent picture signal processing systems for respective colors of red (R), green (G) and blue (B). Alphabets R, G and B subsequent to numerals indicate that members represented by the numerals belong to the systems for processing red, green and blue signals, respectively.

The picture processing unit includes picture input terminals 1R, 1G and 1B for receiving 8 bit data signals and picture output terminals 2R, 2G and 2B for outputting 8 bit data signals.

Numerals 3R', 3G' and 3B' integrated circuits (picture processing IC) as signal processing units. Numerals 4R, 4G, 4B, 5R, 5G, 5B, 6R, 6G and 6B are frame memories for memorizing pictures. Numerals 10R, 10G, 10B, 11R, 11G, 11B, 12R, 12G and 12B are memory control lines each having a capacity of 16 bits and used for supplying clock signals for memories and signals for write control, read control, chip selection, address designation, etc. Numerals 13R, 13G, 13B, 14R, 14G, 14B, 15R, 15G and 15B are input and output terminals for 16 bit data. Numeral 7 denotes a basic clock signal input terminal for the signal processing ICs (3R', 3G' and 3B'). Numerals 8 and 9 denote input terminals for a horizontal synchronizing signal and a vertical synchronizing signal, respectively.

Picture data inputted from the terminals 1R, 1G and 1B are inputted to the signal processing ICs 3R', 3G' and 3B', whereby data are written in and read out from the memories 4R, 4G, 4B, 5R, 5G, 5B, 6R, 6G and 6B to provide operation results, which are outputted through the terminals 2R, 2G and 2B.

The memories 4R, 4G and 4B and 5R, 5G and 5B are supplementary memories for performing write-in and readout alternately by exchange at prescribed internals. Further, the memories 6R, 6G and 6B are used for high function picture processing different from the memories 4R, 4G and 4B and 5R, 5G and 5B.

More specifically, while data are written in the memories 4R, 4G and 4B through data lines 13R, 13G and 13B under the control by the control lines 10R, 10G and 10B, data are read out from the memories 5R, 5G and 5B through the data lines 14R, 14G and 14B under the control by the control lines 11R, 11G and 11B. On the other hand, the memories 6R, 6G and 6B are subjected to writing and readout under direction of the control lines 12R, 12G and 12B independently of the operation of the memories 4R, 4G and 4B and 5R, 5G and 5B.

In this instance, the memories 4R, 5R and 6R, e.g., of the same color system are operated and controlled at different time.

On the other hand, the memories 4G and 4B are operated and controlled at identical time as the memory 4R.

Figure 3:
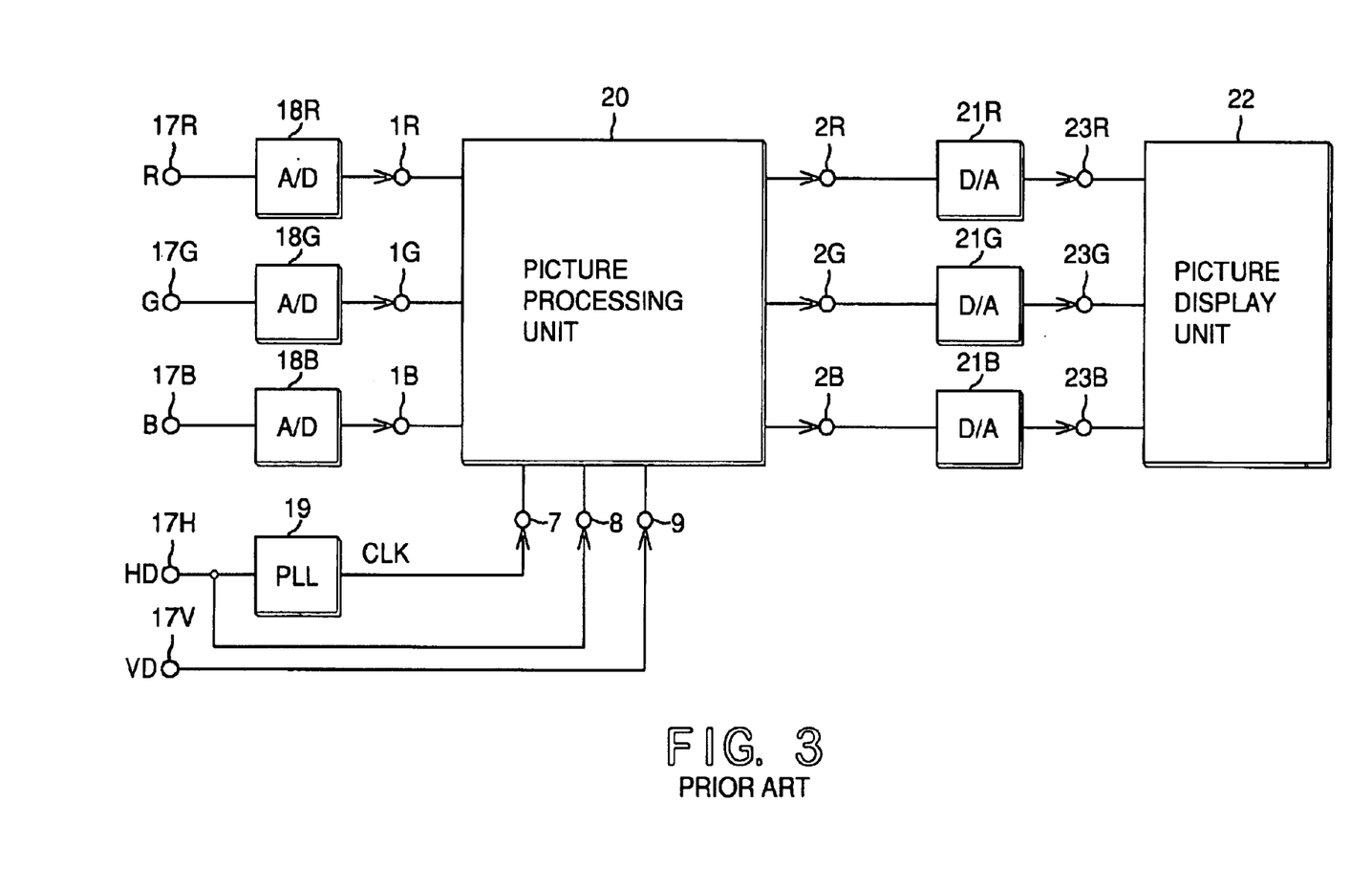
FIG. 3 is a block diagram of a picture display apparatus including such a conventional picture processing apparatus.

FIG. 3 is a block diagram of a picture display apparatus incorporating such a picture processing unit. Numerals 17R, 17G and 17B denote input terminals for picture signals of red (R), green (G) and blue (B), and numerals 17H and 17V are input terminals for a horizontal synchronizing signal (HD) and a vertical synchronizing signal (VD). Numerals 18R, 18G and 18B denote A/D converters, and a block 20 represents a picture processing unit shown in FIG. 2. Numerals 21R, 21G and 21B are D/A converters, and a block 22 represents a picture display unit, such as a CRT or a liquid crystal panel. Numerals 23R, 23G and 23B denote picture processing input terminals to the picture display unit 22.

Further, a block 19 represents a PLL circuit which receives the horizontal synchronizing signal to generate a clock signal synchronized with input signals. On receiving the clock signal, HD and VD, the picture processing unit 20 generates drive signals for the A/D converters, D/A converters and picture display unit, but the description of such drive signal generation is omitted.

Signals inputted to the terminals 17R, 17G and 17B are converted into digital signals by the A/D converters 18R, 18G and 18B, which digital signals are processed in the picture processing unit 20 and then again converted into analog signals by the converters 21R, 21G and 21B to be supplied to the picture display unit 22 for picture display.

Figure 4:
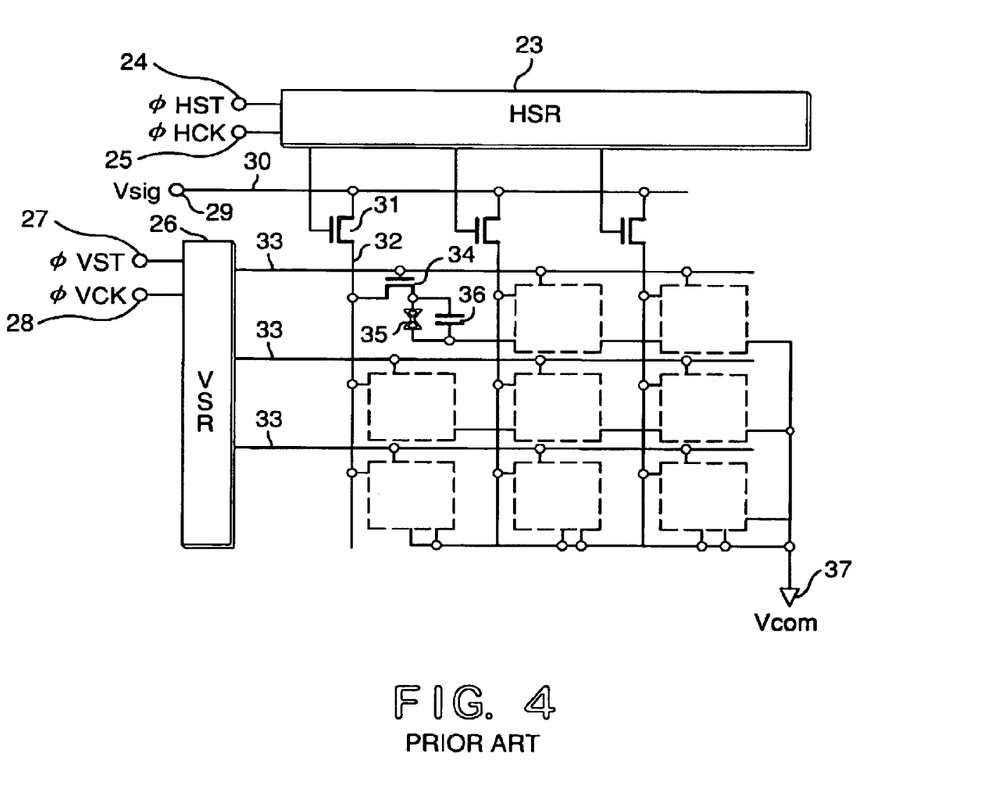
FIG. 4 is a simplified equivalent circuit diagram of a liquid crystal display panel as an example of picture display device.

The picture display unit 20 may for example comprise a liquid crystal panel. FIG. 4 is a block diagram of such a liquid crystal panel. Referring to FIG. 4, the liquid crystal panel includes a horizontal shift register (HSR) 23 as a horizontal scanning circuit receiving a start pulse (OHST) and a horizontal shift clock signal (OHCK) via terminals 24 and 25, respectively. On the other hand, a vertical shift register (VSR) 26 as a vertical scanning circuit receives a start signal (OVST) and a vertical shift clock signal (OVCK). Video signals are inputted via a input terminal 29 and supplied via a common signal line 30 and transfer switches 31 to vertical signal lines 32 and then via transfer switches 34 to liquid crystal pixels 35 in parallel with holding capacitors 36. The transfer switches 31 and 34 comprise MOS transistors. Vertical scanning signals are supplied sequentially through gate lines 30 to turn on the MOS transistors connected thereto. Opposite the substrate carrying MOS switches 34, a counter electrode (common electrode) 37 is disposed.

Inputted video signals are sequentially selected by the horizontal shift register (HSR) 23 and transferred via the transfer switches 31 to the vertical signal lines 32. At this time, the vertical shift register (VSR) 26 selects one gate line 32. As a result, the transfer switches 34 are turned on to supply signals to liquid crystal pixels comprising the liquid crystal 35 and the retention capacitor 36, thereby effecting picture display at the pixels.

As described above, such a picture display apparatus is required to include a plurality of frame memories for effecting higher function, multiple function and higher speed display.

Such a conventional picture processing unit as shown in FIG. 2 has involved problems as follows. Taking only the red processing unit 82 for example, the memory control outputs are in a number of 16×3=48 lines for the control lines 13R, 14R and 15R, and the data input and output lines are in a number of 16×3=48 lines for the data lines 10R, 11R and 12R, thus requiring 96 lines only between the IC 3R' and the memories 4R, 5R and 6R. In addition, the input and output terminals 1R and 2R, the clock signal terminal 7 and horizontal and vertical synchronizing signal terminals 8 and 9, drive pulses, power supply and GND (ground) require additional lines. As a result, the number of input and output lines or pins for one IC is increased, whereby not only the IC package size and the loading substrate size are enlarged but also a required number of pins are not provided by an ordinary IC package such as QFP (quad flat package), thus requiring a special shape of package such as BGA (ball grid array) necessitating a special packaging step and increased production cost.

SUMMARY OF THE INVENTION

An object of the present invention is to provide an inexpensive picture processing apparatus including a picture processing IC with a reduced number of pins for outputting memory control signal even though it is a large scale circuit having many memories.

Another object of the present invention is to provide a picture processing apparatus capable of stable operation with a broad time margin even in a high-speed large-seal circuit.

According to the present invention, there is provided a picture processing apparatus, including a plurality of picture processing systems; wherein each picture processing system includes an identical picture processing IC (integrated circuit) and a plurality of memories each capable of memorizing a picture frame and including at least two memories operating at different timings, and the picture processing IC comprises a picture processing unit, an operation timing signal generator, a plurality of control timing signal generators for controlling different memories, and a memory control signal selection circuit for selectively outputting one of at least two memory control timing signals.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
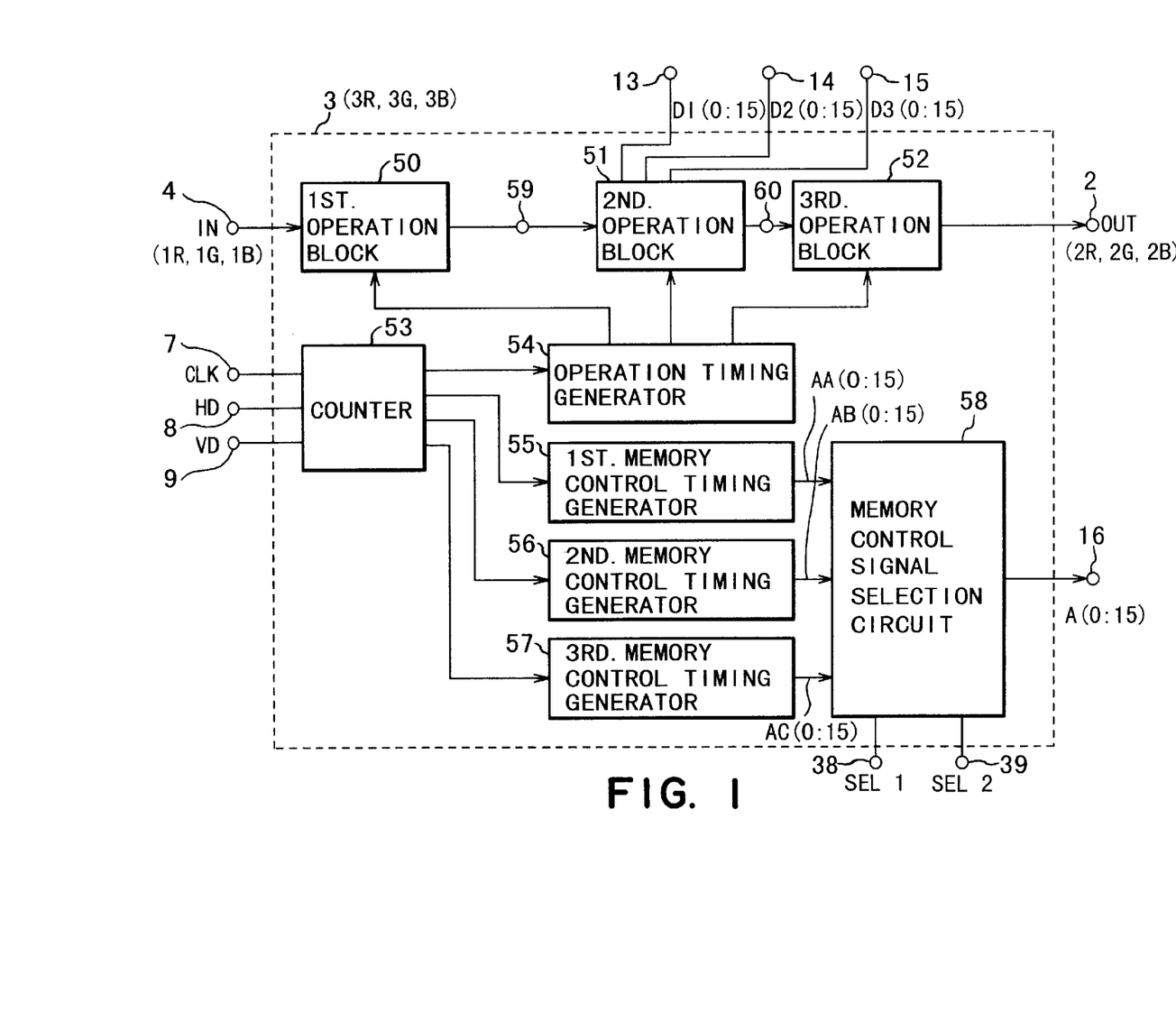
FIG. 1 is a block diagram of a picture processing IC used in a first embodiment of the invention.
Figure 5:
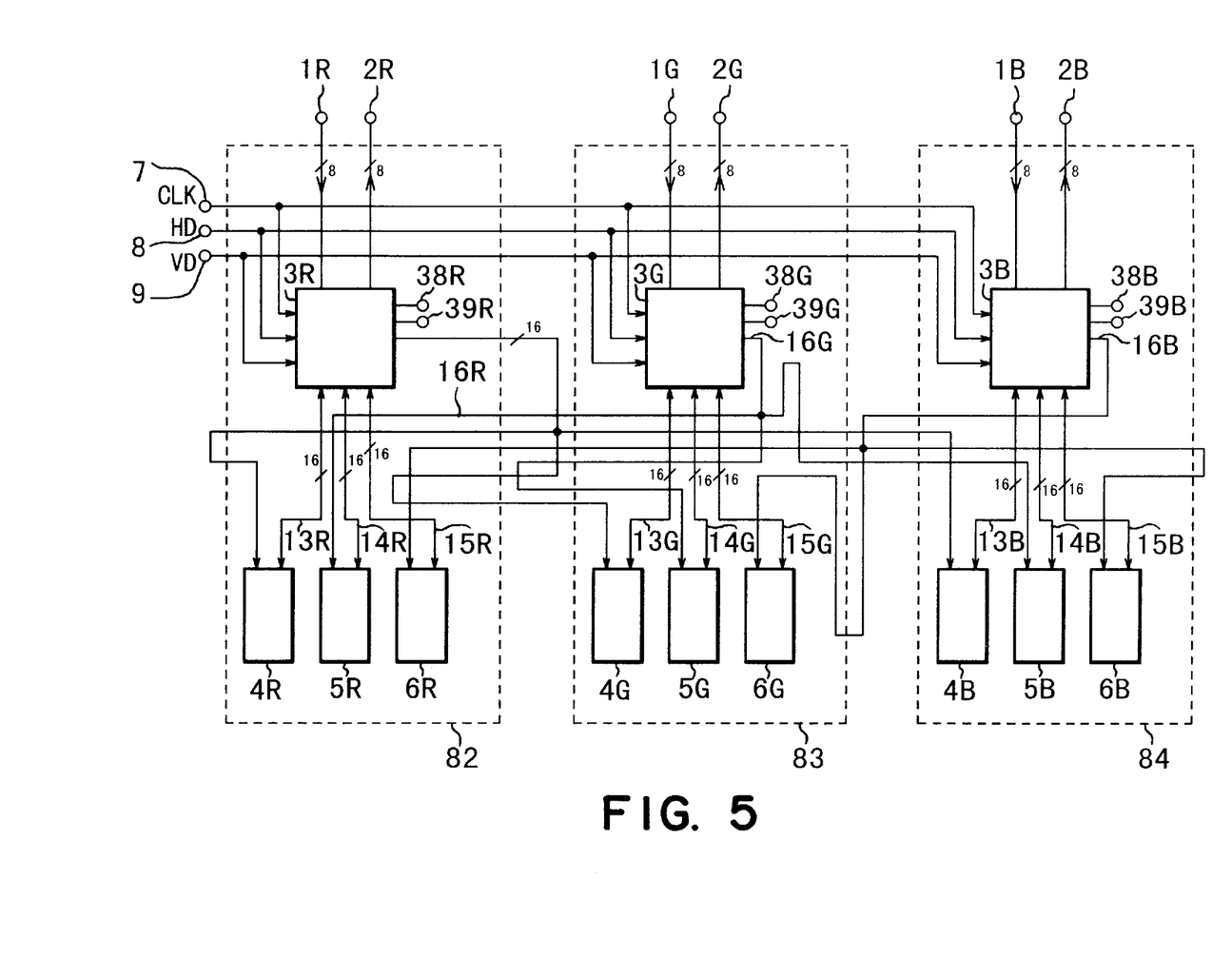
FIG. 5 is a block diagram of a first embodiment of the picture processing apparatus according to the invention.

A first embodiment of the present invention is described with reference to FIGS. 1 and 5. FIG. 1 is a block diagram of a picture processing IC 3 according to the present invention, and FIG. 5 is a block diagram of a picture processing apparatus including three of such ICs (3R, 3G and 3B) and related memories as data memory means.

Referring to FIG. 1, the picture processing IC includes a picture signal input terminal 4 corresponding to the terminals 1R, 1G and 1B in the apparatus of FIG. 2, and a picture signal output terminal 2 corresponding to the terminals 2R, 2G and 2B in FIG. 2.

The IC 3 is further provided with an input terminal 7 for basic clock signal (CLK), a horizontal synchronizing signal (HD) input terminal 8 and a vertical synchronizing signal (VD) input terminal 9.

The IC 3 further includes first to third operation blocks 50–52 for processing the inputted picture signals including a second block 51 for processing picture data via frame memories. The IC 3 is further provided with data buses 13, 14 and 15 for exchanging 16 bit data D1 (0:15), D2 (0:15) and D3 (0:15) with memories, and input and output terminals 59 and 60 for the second operation block 51.

The IC 3 further includes a counter 53 for counting clock pulses CLK based on the clock signal CLK, the horizontal synchronizing signal HD and the vertical synchronizing signal VD, an operation timing signal generator 54 for decoding the counter output to generate an operation timing signal, a first memory control timing signal generator 55 for decoding the counter output to generate a first memory control timing signal, a second memory control timing signal generator 56 for decoding the counter output to generate a second memory control timing signal, and a third memory control timing signal generator 57 for decoding the counter output to generate a third memory control timing signal. From the generators 55–57, 16 bit memory control signals AA (0:15), AB (0:15) and AC (0:15) are outputted to a memory control signal selection circuit 58, where a selection signal A (0:15) is outputted from a memory control output terminal 16. The selection of memory control signals is performed by selection switching signals SEL1 and SEL2 inputted from terminals 38 and 39.

Referring to FIG. 5 showing three of such signal processing ICs 3R, 3G and 3B together with related memories, picture signals each comprising 8 bit data are inputted from terminals 1R, 1G and 1B, and picture signal each comprising 8 bit data are outputted from terminals 2R, 2G and 2B.

The picture processing apparatus shown in FIG. 5 includes three signal processing ICs 3R, 3G and 3B each having an organization as explained with reference to FIG. 1, and three sets of frame memories 4R, 4G and 4B, 5R, 5G and 5B, and 6R, 6G and 6B for memorizing picture data. The apparatus further includes memory control signal buses 16R, 16G and 16B for transferring memory control signals inclusive of a clock signal and for write control, read control, chip selection and address designation.

The memories 4R, 4G and 4B are controlled by the memory control bus 16R, the memories 5R, 5G and 5B are controlled by the memory control bus 16G, and the memories 6R, 6G and 6B are controlled by the memory control bus 16B.

The ICs 3R, 3G and 3B are connected to the memories 4R, 5R and 6R, 4G, 5G and 6G, and 4B, 5B and 6B via three sets of input and output buses 13R, 14R and 15R, 13G, 14G and 15G, and 13B, 14B and 15B. The apparatus further includes an input terminal 7 for supplying a basic clock signal for the signal processing ICs 3R, 3G and 3B, and input terminals 8 and 9 for a horizontal synchronizing signal and a vertical synchronizing signal.

Three ICs 3R, 3G and 3B are provided with input terminals 38R and 39R, 38G and 39G, and 38B and 39B, respectively, for receiving selection switching signals SEL1 and SEL2.

Figure 6A:
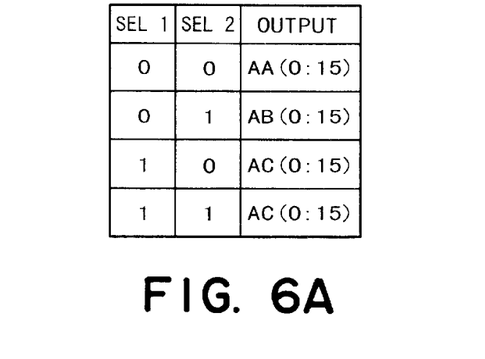
FIG. 6A is an operation table for a memory control signal selection circuit used in the first and second embodiments of the invention.
Figure 6B:
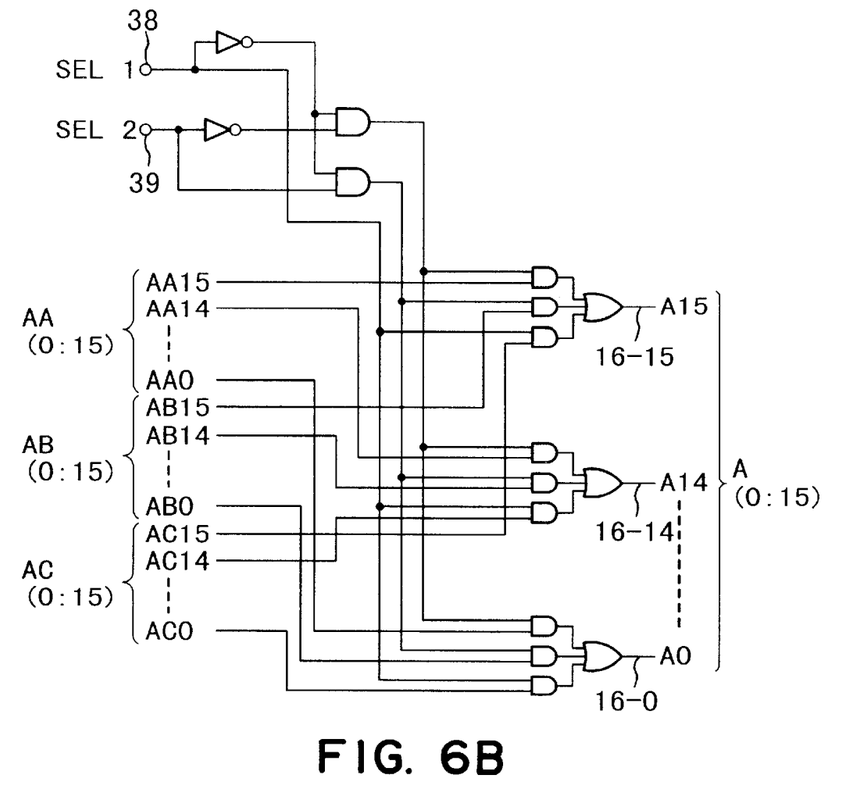
FIG. 6B is a circuit diagram of the memory control signal selection circuit.

The organization of the memory control signal selection circuit 58 (FIG. 1) is shown in FIG. 6B and an operation table therefor is shown in FIG. 6A. Lines 16-0 to 16-15 are respective lines of the memory control output buses 16R, 16G and 16B. Depending on selection switching signals SEL1 and SEL2 inputted from terminals 38 and 39, a set of control signals A (0:15) are selected from three set of control signals AA (0:15), AB (0:15) and AC (0:15) according to Table 6A and outputted through memory control output buses 16R, 16G and 16B.

Figure 10A:
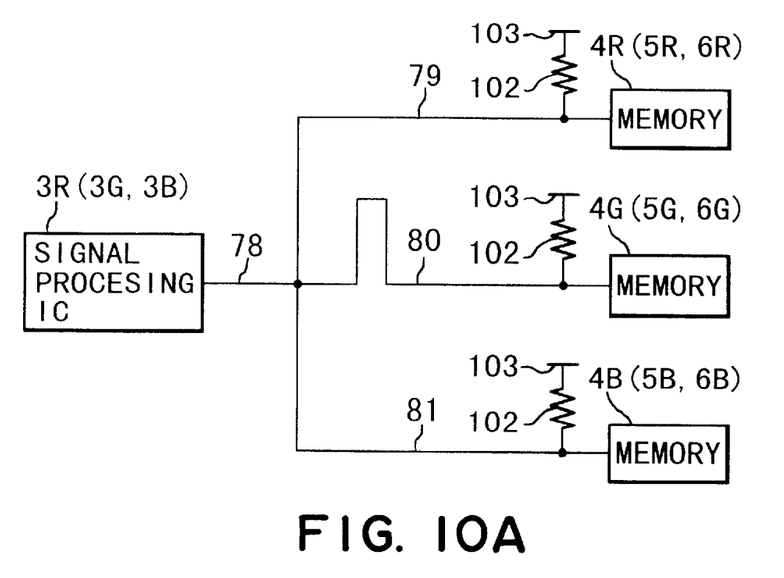
FIGS. 10A and 10B illustrate two types of star connections.
Figure 10B:
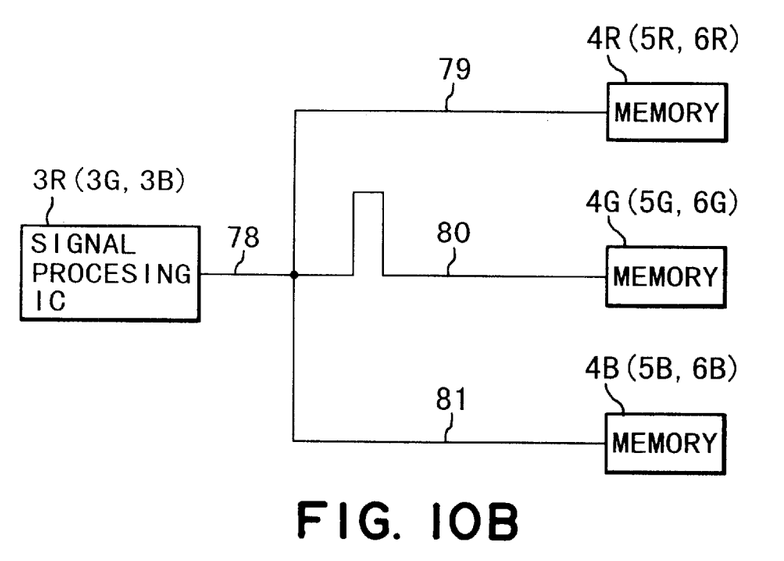

FIGS. 10A and 10B illustrate a concept of the memory control bus 16. The memory bus 16R (FIG. 5) connected to the signal processing IC 3R proceeds along line 78 and branched into lines 79, 80 and 81 which are connected to the memories 4R, 4G and 4B. By applying a star wiring with equal lengths of lines 79–81 after branching to all the memory control buses (16R, 16G and 16B), it becomes possible to reduce adverse effect of unnecessary reflection, facilitate impedance matching and equalizing the delay, thereby ensuring operation margin and stability.

As mentioned above, a memory control bus actually includes signal lines for a memory clock signal, write control, read control, chip selection and address designation. Accordingly, for a quick transmission line, such as a clock signal line, impedance matching is effected by a terminal resistor 82 connected to a terminal potential as shown in FIG. 10A. However, for most other lines, termination is not practical because of restriction of arrangement and capacity of output buffer and the necessity of termination is low, so that only impedance matching is effected by a connection as shown in FIG. 10B or by inserting series resistances. Actually, the whole bus is subjected to a star connection by combination of connections shown in FIGS. 10A and 10B. Hitherto, it has been tried to effect a star connection for important signal lines, such as one master clock signal for a picture processing IC, but no trial has been made for applying star connection to all the bus lines. In the present invention, e.g., 16 bit lines of a memory bus are all subjected to star connection in parallel in order to obtain memory control signals with little skew and little ringing in a system wherein a memory control line is taken out of a picture processing IC in one picture processing unit and other remote picture processing units are operated at identical timing at a high speed.

Now, an operation example of displaying an arithmetic mean of a current frame picture and pictures of one and two frame before is taken. The second operation block 51 in the IC 3 of FIG. 1 is assumed to have a circuit structure shown in FIG. 8 including a memory data bus switching circuit 61 and a circuit 62 for adding and averaging three frame data. For real time picture possessing, if one frame memory is respectively subjected to writing and readout by switching, a high picture processing speed is required and an excessive load is placed on the hardware. Accordingly, three frame memories are provided to effect writing and readout alternately by switching, thereby suppressing the increase in picture processing speed.

Figure 7:
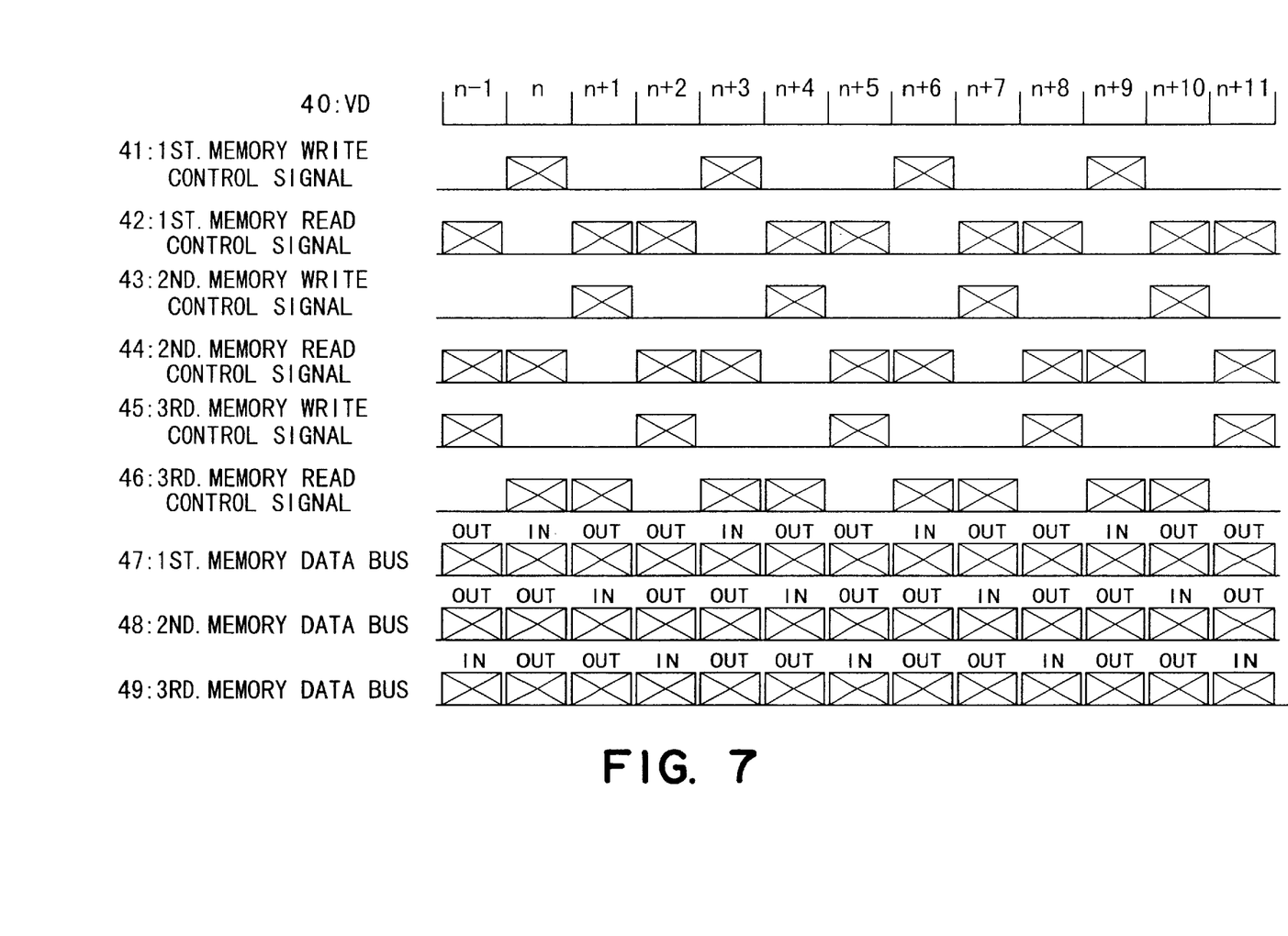
FIG. 7 is a time chart for illustrating an operation of the first embodiment of the picture processing apparatus according to the invention.
Figure 9:
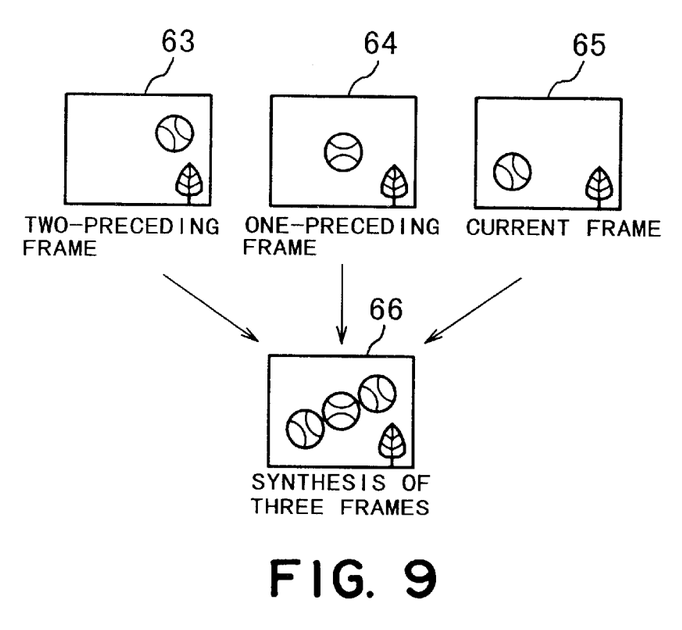
FIG. 9 illustrates an operation example performed by the first embodiment of the invention.

FIG. 9 illustrates the operation and FIG. 7 is a time chart for the operation.

Referring to FIG. 7, at 40 is shown a vertical synchronizing signal, at 41 is shown a writing control signal for first memories 4R, 4G and 4B, and at 42 is shown a readout control signal from the first memories 4R, 4G and 4B. The writing control signal and the readout control signal in combination provide signals AA (0:15) sent via the memory control bus 16R. At 43 is shown a writing control signal for the second memories 5R, 5G and 5B, and at 44 is shown a readout control signal for the second memories 5R, 5G and 5B, which in combination provide signals AB (0:15) sent via the memory control bus 16G. Further, at 45 is shown a writing control signal and at 46 is shown a readout control signal respectively the third memories 6R, 6G and 6B, which in combination provide signals AC (0:15) sent via the memory control bus 16B. At 47 is shown a writing and readout signal via data bus 16R for memories 4R, 4G and 4B; 48, a writing and readout signal via data bus 16G for memories 5R, 5G and 5B; and 49, a writing and readout signal via data bus 16B for memories 6R, 6G and 6B. At 47–49, IN refers to data written in memories and OUT refers to data read out from memories.

Figure 8:
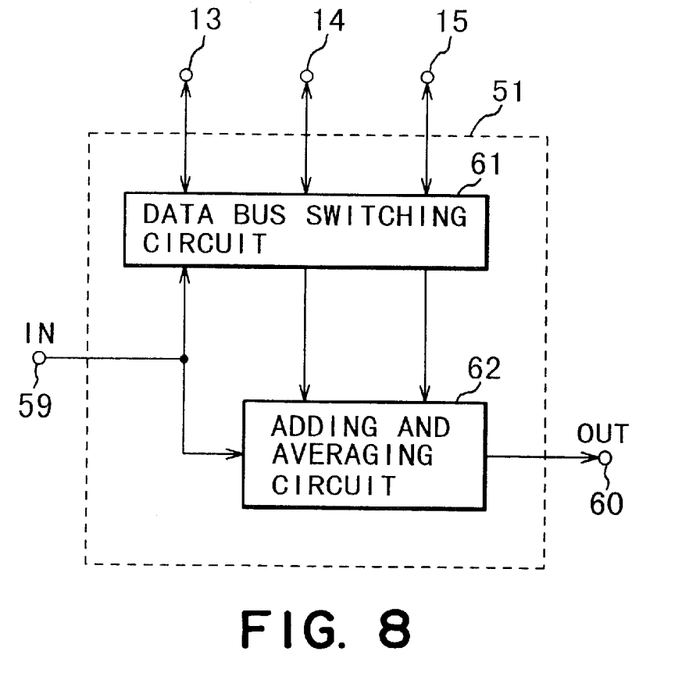
FIG. 8 is a block diagram of an operation block contained in the/picture processing IC used in the first embodiment of the invention.

Different picture signals 65 (shown in FIG. 9) inputted to the second operation block 51 (shown in FIG. 1) are inputted to a memory connected to a selected one of the data buses 13, 14 and 15 by a data bus switching circuit 61 (FIG. 8) and also inputted to an adding and averaging circuit 62 (FIG. 8). Further, via the remaining two data buses among 13, 14 and 15 not receiving the current frame data, picture data for one frame (64; FIG. 9) and two frames (63; FIG. 9) preceding the current frame are inputted from memories to the adding and averaging circuit 62, where picture data 66 (FIG. 9) are formed by adding and averaging three succeeding frames.

Now, the operation of R (red) system is taken for example and the operation of three frame memories 4R, 5R and 6R connected to the IC 3R is considered with reference to FIG.

5 in parallel with FIG. 7. At n-th frame, the memory 4R is written by the writing signal 41, and one-frame preceding data and two-frame preceding data are read out from the memories 5R and 6R by the readout signals 44 and 46. At the next n+1-th frame, the memory 5R is written by the writing signal 43 and one-frame preceding data and two-frame preceding data are read out from the memories 4R and 6R by the readout signals 42 and 46. At the next n+2-th frame, the memory 6R is written by the writing signal 45, and one-frame preceding data and two-frame preceding data are red out from the memories 4R and 5R by the readout signals 42 and 44. In this way, in a a three-frame cycle, one memory is written and two memories are read alternately and sequentially in time division. Thus, the memories 4R, 5R and 6R are subjected to different operations at identical time, and the memory control buses 16R, 16G and 16B effect different types of control.

As for systems of different colors, the systems of G (green) and B (blue) process different video signals, but the time serial operation is identical to the operation in the system of R (red), i.e., time-division drive of memories in a three-frame cycle.

Accordingly, memories of respective colors having identical roles (i.e., 4G and 4B for 4R, 5G and 5B for 5R, and 6G and 6B for 6R) are connected to the same control lines 16R, 16G and 16B, and each of the signal processing circuits 3R, 3G and 3B is in charge of supplying one type of control signal selectively (i.e., 3R for control signals on the line 16R, 3G for control signals on the line 16G, and 3B for control signals on the line 16B).

As a result, the number of control lines for 9 memories is reduced to 3, and the number of memory control bus for each signal process IC is reduced from 3 to 1, whereby the latitude for packaging of signal processing ICs and selection of circuit substrates is enlarged, and a reduction in production cost is achieved.

Further, by adopting a star connection of equal length lines after branching for all the memory control buses, even a large-scale circuit can be operated stably with a broad timing margin.

SECOND EMBODIMENT

Figure 11:
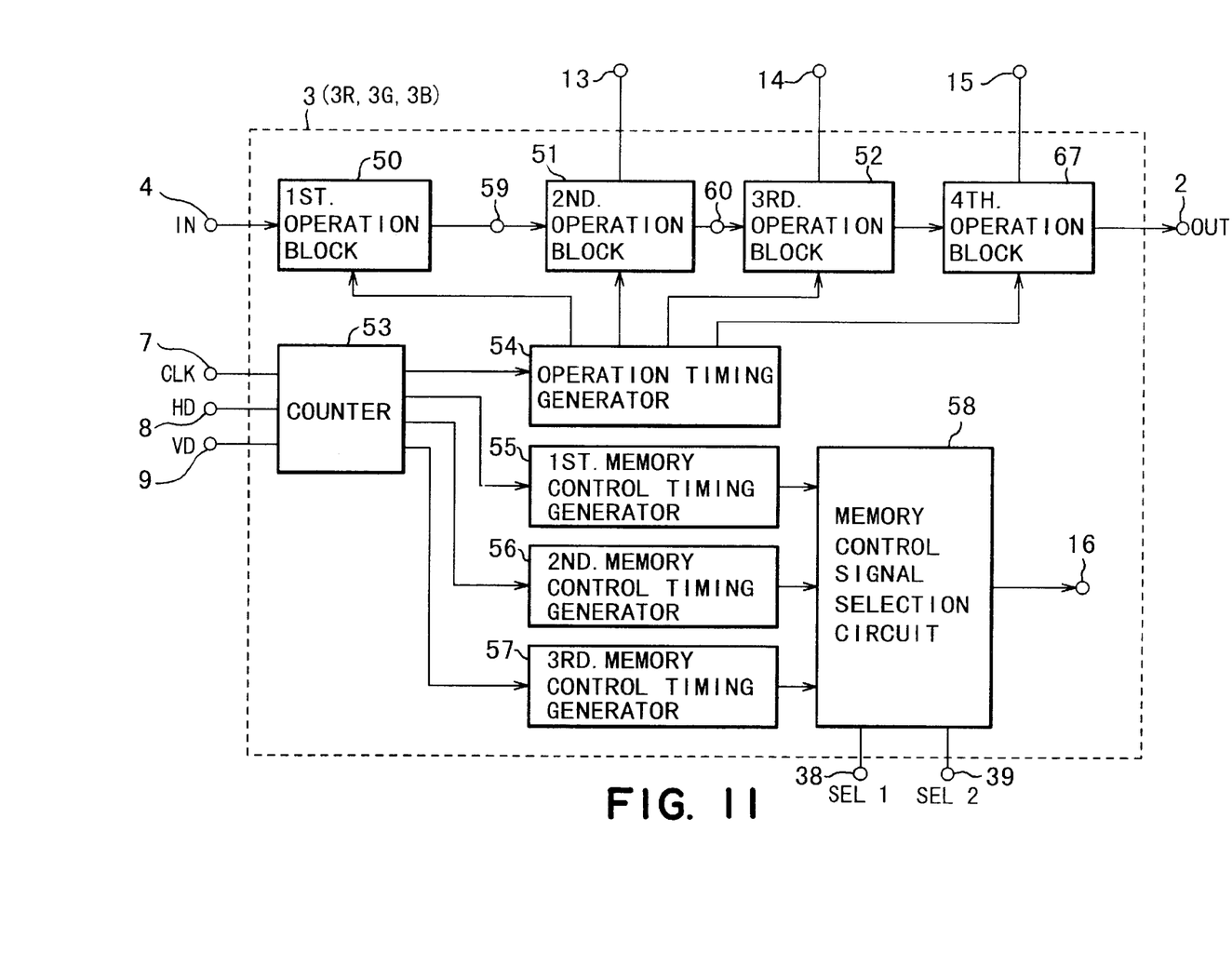
FIG. 11 is a block diagram of a picture processing IC used in a second embodiment of the picture processing apparatus according to the invention.

FIG. 11 is a block diagram of a signal processing IC constituting a second embodiment of the picture processing apparatus of the present invention. The circuit in this embodiment is used for realizing there different functions by using memories for three picture frames. Such operation may for example be utilized for motion detection, resolution conversion, contour extraction, picture synthesis, picture-in-picture, and picture correction. In FIG. 11, like parts are denoted by like reference numerals as in FIG. 1.

Referring to FIG. 11, the IC 3 includes first to fourth operation blocks 50, 51, 52 and 67, among which the second to fourth operation blocks 51, 52 and 67 are operated to effect picture processing via frame memories and each block is connected to one memory so as to allow three systems to effect mutually different processings at different timings. Other parts are similar to those in the embodiment of FIG. 1.

Now, display is taken as an example. The first block 50 is used, e.g., for controlling the gamma of inputted picture signals, thereby improving the gradation characteristic. The block 51 is operated as a resolution conversion unit for converting the display format of the input picture signals to a format adapted to the number of pixels of the display device, wherein a frame memory is used for enlargement and reduction. The block 52 operates for displaying a menu frame in superposition on another picture by using an on-screen display function, and graphic data, such as a menu frame, is developed on the frame memory for synthesis in this operation block. The block 67 operates for providing another input picture on its frame memory and effecting a sub-frame display by synthesis in this operation block.

Also in this embodiment, the picture processing blocks have the organization as shown in FIG. 5, and the memory control signal selection circuit of FIG. 6B and the star connection structures of FIGS. 10A and 10B are also adopted.

Referring to FIG. 11, the picture processing IC includes a picture signal input terminal 1 corresponding to the terminals 1R, 1G and 1B in the apparatus of FIG. 2, a picture signal output terminal 2 corresponding to the terminals 2R, 2G and 2B in FIG. 2, an input terminal 7 for basic clock signal (CLK), a horizontal synchronizing signal (HD) input terminal 8 and a vertical synchronizing signal (VD) input terminal 9.

Among the four operation blocks, the latter three blocks 51, 52 and 67 process pictures via frame memories. Each of the three blocks is provided with one memory system so as to effect three different processings by three systems. Accordingly, unlike in the first embodiment, time-division memory use such that two systems are used for reading frame data while one system is used for writing, cannot be effected. As a result, each operation block is provided with an adequate capacity (e.g., for two lines) of FIFO (fast in-fast out)-type line memory as an internal buffer, and one memory system is used to effect one type of operation by switching the memory system for writing and for readout at prescribed intervals while utilizing the line memory for buffering.

The IC 3 is further provided with data buses 13, 14 and 15 for exchanging 16 bit data D1 (0:15), D2 (0:15) and D3 (0:15) with memories, and input and output terminals 59 and 60 for the second operation block 51.

The IC 3 further includes a counter 53 for counting clock pulses CLK based on the clock signal CLK, the horizontal synchronizing signal HD and the vertical synchronizing signal VD, an operation timing signal generator 54 for decoding the counter output to generate an operation timing signal, a first memory control timing signal generator 55 for decoding the counter output to generate a first memory control timing signal, a second memory control timing signal generator 56 for decoding the counter output to generate a second memory control timing signal, and a third memory control timing signal generator 57 for decoding the counter output to generate a third memory control timing signal. From the generators 55–57, 16 bit memory control signals AA (0:15), AB (0:15) and AC (0:15) are outputted to a memory control signal selection circuit 58, where a selection signal A (0:15) is outputted from a memory control output terminal 16. The selection of memory control signals is performed by selection switching signals SEL1 and SEL2 inputted from terminals 38 and 39.

Figure 12:
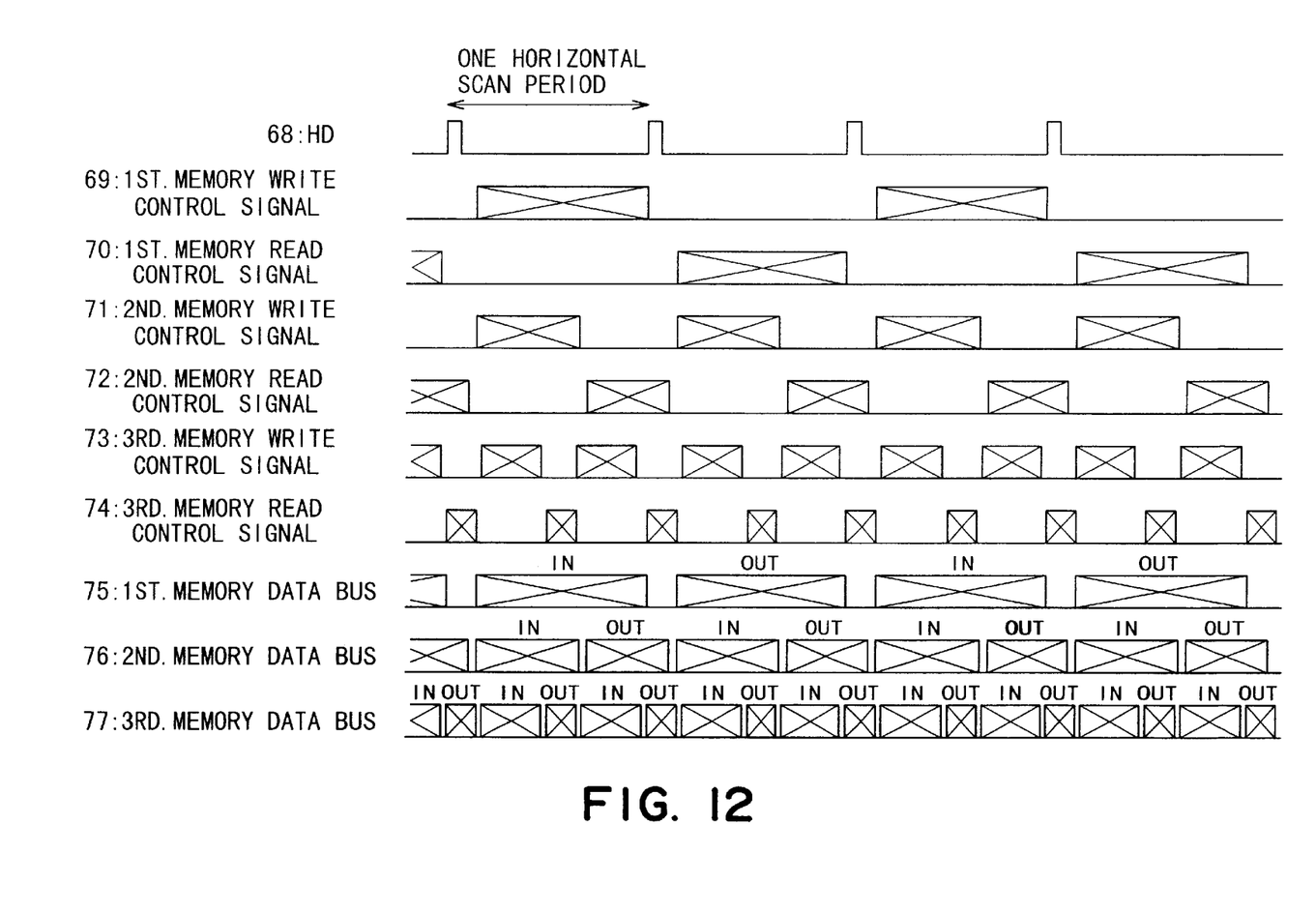
FIG. 12 is a time chart for illustrating an operation of the second embodiment of the picture processing apparatus according to the invention.

A time chart for this embodiment is shown in FIG. 12.

Referring to FIG. 12, at 68 is shown a vertical synchronizing signal, at 69 is shown a writing control signal for first memories 4R, 4G and 4B, and at 70 is shown a readout control signal from the first memories 4R, 4G and 4B. The writing control signal and the readout control signal in combination provide signals AA (0:15) sent via the memory control bus 16R. At 713 is shown a writing control signal for the second memories 5R, 5G and 5B, and at 72 is shown a readout control signal for the second memories 5R, 5G and 5B, which in combination provide signals AB (0:15) sent via the memory control bus 16G. Further, at 73 is shown a writing control signal and at 74 is shown a readout control signal respectively the third memories 6R, 6G and 6B, which in combination provide signals AC (0:15) sent via the memory control bus 16B. At 75 is shown a writing and readout signal via data bus 16R for memories 4R, 4G and 4B; 76, a writing and readout signal via data bus 16G for memories 5R, 5G and 5B; and 77, a writing and readout signal via data bus 16B for memories 6R, 6G and 6B. At 75–77, IN refers to data written in memories and OUT refers to data read out from memories.

In this embodiment, the second to fourth operation blocks 51, 52 and 67 effect utterly different operations. For the purpose of easy illustration, this is represented by different timings of writing and readout at 69–77 in FIG. 12. The second operation block 51 writes two lines in the first memory within one horizontal scanning period as shown at 19 and then read out two lines in a subsequent one horizontal scanning period as shown at 70, thereby writing one picture frame in one frame period and effecting readout for providing a different resolution. The third operation block 52 writes one line in a half horizontal scanning period as shown at 71 and then read out one line in a subsequent half horizontal scanning period to provide picture signals superposed with an on-screen picture frame in one frame period. The fourth operation block 52 writes a half line within a quarter horizontal scanning period and then read out a half line in a subsequent quarter period to form a sub-frame picture in one frame period.

Accordingly, also in this embodiment, the memories 4R, 5R and 6R in FIG. 5 are subjected to different operations at an identical time, so that different controls are dictated through the control buses 16R, 16G and 16B.

On the other hand, if the operation of different color systems is considered, the systems of G (green) and B (blue) process different video signals, but the time serial operation is identical to the operation in the system of R (red), for resolution conversion, on-screen display and sub-frame picture display, similarly as in the first embodiment.

Accordingly, memories of respective colors having identical roles (i.e., 4G and 4B for 4R, 5G and 5B for 5R, and 6G and 6B for 6R) ar connected to the same control lines 16R, 16G and 16B, and each of the signal processing circuits 3R, 3G and 3B is in charge of supplying one type of control signal selectively.

As a result, the number of control lines for 9 memories is reduced to 3, and the number of memory control buses for each signal process IC is reduced from 3 to 1, whereby the latitude for packaging of signal processing ICs and selection of circuit substrates is enlarged, and a reduction in production cost is achieved.

Further, by adopting a star connection of equal length lines after branching for all the memory control buses, even a large-scale circuit can be operated stably with a broad timing margin.

As described above, according to the present invention, the number of control signals outputted from one picture process IC is reduced to reduce the cost of the IC and a circuit substrate therefor, and further by equalizing the lengths of the control bus lines, even a large-size circuit can be stably operated with a broad timing margin, thus affording a high-functionality picture processing apparatus at a lower cost.

What is claimed is:

1. A picture processing apparatus, including a plurality of picture processing systems; wherein each picture processing system includes an identical picture processing IC (integrated circuit) and a plurality of memories each capable of memorizing a picture frame and including at least two memories operating at different timings, and the picture processing IC comprises a picture processing unit, an operation timing signal generator, a plurality of control timing signal generators for controlling different memories, and a memory control signal selection circuit for selectively outputting one of at least two memory control timing signals.

2. A picture processing apparatus according to claim 1, wherein the plurality of the picture processing ICs in the plurality of picture processing systems output mutually different memory control timing signals.

3. A picture processing apparatus according to claim 2, wherein a memory control timing signal outputted from the picture processing IC of one picture processing system commonly controls operation timing of not only a memory corresponding to the operation timing in said one picture processing system but also a memory corresponding to the operation timing of another picture processing system through a bus.

4. A picture processing apparatus according to claim 3, wherein the bus led out of the picture processing IC is branched into equal lengths of branch lines to the memories of identical operating timing in the plurality of picture processing systems.

5. A picture display apparatus, including a signal processing unit comprising a picture processing apparatus according to any one of claims 1–4.

6. An image pickup apparatus, including a signal processing unit comprising a picture processing apparatus according to any one of claims 1–4.

* * * * *

UNITED STATES PATENT AND TRADEMARK OFFICE
CERTIFICATE OF CORRECTION

PATENT NO. : 6,912,000 B1
DATED : June 28, 2005
INVENTOR(S) : Kazuyuki Shigeta

It is certified that error appears in the above-identified patent and that said Letters Patent is hereby corrected as shown below:

Title page,
Item [30], Foreign Application Priority Data,
"11/051647" should read -- 11-051647 --.

Column 2,
Line 3, "internals." should read -- intervals. --.

Column 7,
Line 46, "there" should read -- three --.

Signed and Sealed this

Seventh Day of February, 2006

JON W. DUDAS
*Director of the United States Patent and Trademark Office*